Figure 2A:
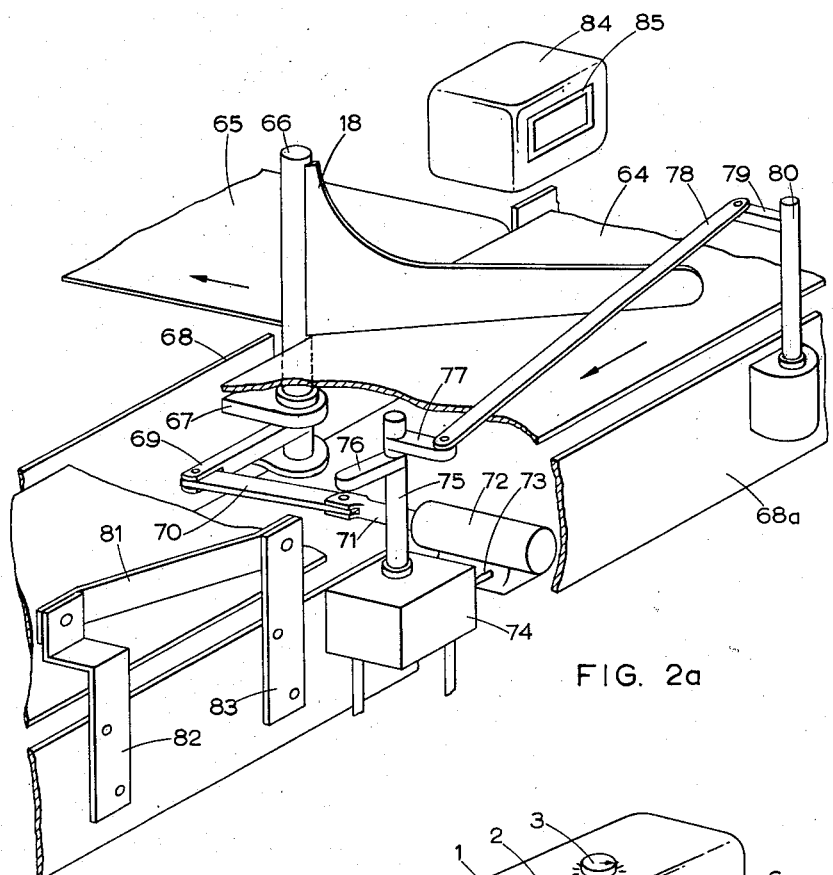

July 4, 1961 A. W. PEARSON 2,990,936
ROUTE SELECTION IN A CONVEYOR SYSTEM
Filed March 10, 1958 4 Sheets-Sheet 1

Inventor
A. W. Pearson
By Glascock Downing Seebold
Attys

July 4, 1961          A. W. PEARSON          2,990,936

ROUTE SELECTION IN A CONVEYOR SYSTEM

Filed March 10, 1958          4 Sheets-Sheet 3

Inventor
A. W. Pearson

July 4, 1961  A. W. PEARSON  2,990,936
ROUTE SELECTION IN A CONVEYOR SYSTEM
Filed March 10, 1958  4 Sheets-Sheet 4

Inventor
A. W. Pearson
By Glascock Downing Diebold
Attys

United States Patent Office 2,990,936
Patented July 4, 1961

2,990,936
ROUTE SELECTION IN A CONVEYOR SYSTEM
Arthur William Pearson, Windsor, England, assignor to Electric & Musical Industries Limited, Hayes, Middlesex, England, a company of Great Britain
Filed Mar. 10, 1958, Ser. No. 720,295
Claims priority, application Great Britain Mar. 12, 1957
8 Claims. (Cl. 198—38)

This invention relates to route selection in conveyor systems and relates especially to powered conveyor systems.

It is often required in a conveyor system comprising a plurality of routes to provide for selection of a predetermined route or destination for a given object or group of objects to be conveyed. It has been proposed to achieve such route selection for some powered conveyors by the technique known as peg setting, which consists of providing on the load carrying member a block having a number of holes into which pegs may be inserted to form one of a number of patterns, so that just prior to arriving at a junction of two or more routes for the conveyor a set of relays or switches corresponding to the arrangement of the holes in the block is actuated in a manner corresponding to those holes which are occupied by pegs. If a particular pattern of relays is actuated, a selection means is operated and the peg block and load carrying member or members are transferred to another route.

Such peg setting techniques only allow selection of a limited number of routes in a conveyor system because a limitation is imposed by the number of combinations of pegs available. Clearly if a large number of pegs are employed a relatively complex relay arrangement must also be employed at each conveyor route junction. Moreover, the selection means at each junction of conveyor routes usually comprise at least one solenoid to transfer the direction control to a mechanical means and the use of a large number of solenoids can substantially increase the cost of the arrangement. Further in belt type conveyors such a system is impractical.

The object of the present invention is to provide an improved arrangement for route selection in a conveyor system.

Apparatus for automatically controlling the transfer of articles comprising a plurality of transfer control means disposed at spaced positions whereby the article transfer can be controlled, a vehicle, actuating mechanism for said transfer control means including a part of said vehicle and a plurality of parts one for each transfer control means coupled to the respective transfer control means, said vehicle part being switchable from inactive to an active condition whereby a transfer control means can be switched in a predetermined way in response to movement of said vehicle to cause said vehicle part to engage with the respective transfer control means part, and selector means on the vehicle which can be preset to cause said vehicle part to be switched to its active condition in response to a selection from a plurality of different responses, response means located in proximity to said transfer control means to provide said plurality of responses, the response means in proximity to different transfer control means being arranged to provide different responses, thereby to cause said vehicle part to be switched to its active condition and switch one or more of said transfer control means and not others of said transfer control means.

Preferably said selector means comprises a plurality of oscillatory circuits which can be preset to oscillate at a selection from among different frequencies respectively characteristic of different transfer control means with means responsive to predetermined loading of any oscillatory circuit for switching said vehicle part to its active condition, and said response means located in proximity to each of said transfer control means parts comprising a resonant circuit, respective tuned circuits being tuned to frequencies characteristic of the respective transfer control means and adapted so to load an oscillatory circuit.

The vehicle may for example be a leader unit which may be placed on the conveyor system in front of the objects to be associated with it and it can be arranged that the level of the output from the oscillator is modified when the leader unit is in the vicinity of a tuned circuit at one of the conveyor junctions. This modification of the output can be employed to operate a relay arrangement which in turn operates a mechanical selector arm, which causes means on the conveyor to be operated to transfer the objects from one route to the other. If the tuned circuit is not tuned to the same frequency as the oscillator in the leader unit, the leader unit and associated objects continue along the same route.

In practice a number of portable leader units can be provided and each unit may be equipped with a fixed part which is positioned to reset any actuated selector means along the conveyor to its normal position so that it does not interfere with the proper selection of the required route for the unit in question.

Figure 1:
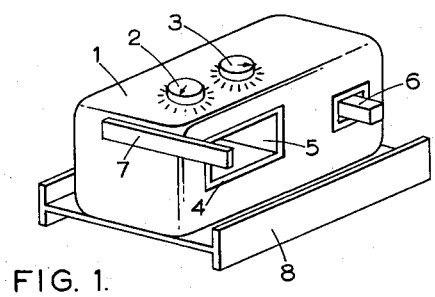
Figure 1A:
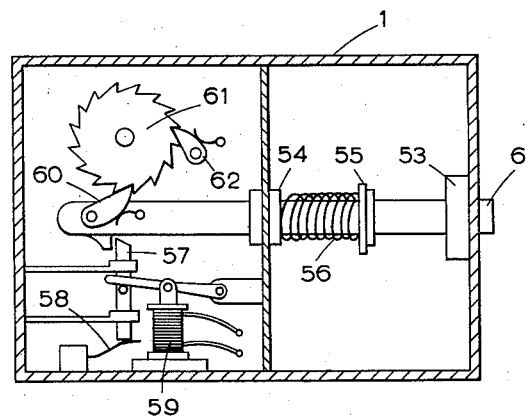
Figure 1B:
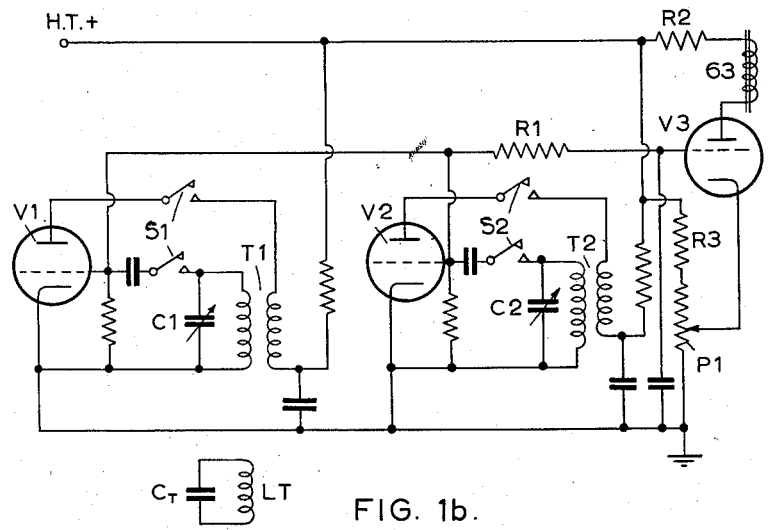
Figure 2:
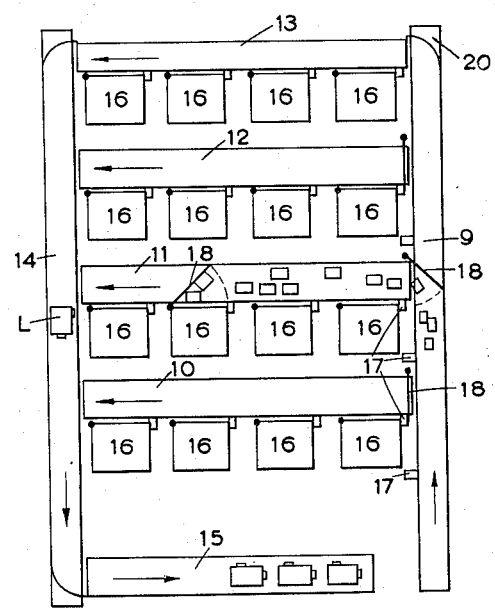
Figure 3:
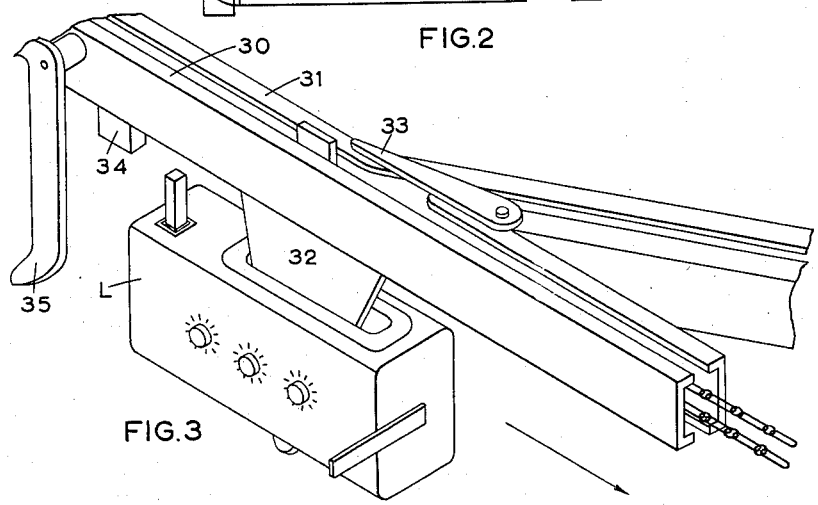
Figure 4:
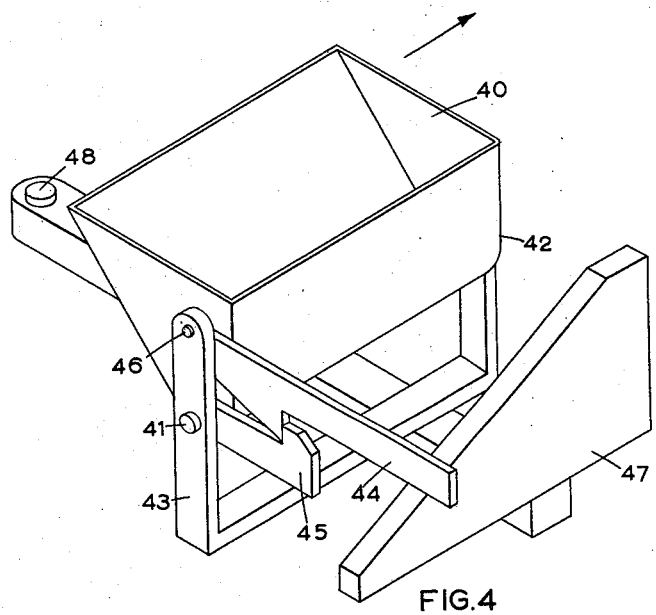
Figure 5:
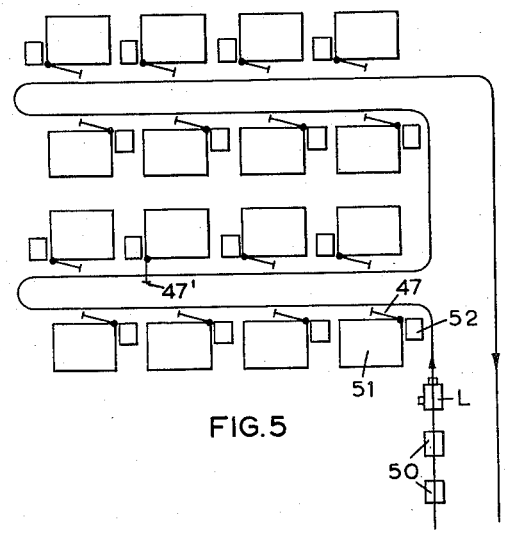

In order that the invention may be clearly understood and readily carried into effect, the same will be fully described with reference to the accompanying drawings in which:

FIGURE 1 illustrates one example of a portable leader unit according to the invention, FIGURE 1a illustrates a section through a leader unit such as shown in FIGURE 1, FIGURE 1b illustrates a circuit arrangement suitable for use in a leader unit such as shown in FIGURE 1, FIGURE 2 illustrates in schematic form one example of a conveyor belt system in accordance with the present invention employing leader units such as illustrated by FIGURE 1, FIGURE 2a illustrates transfer control means as used at each conveyor junction in FIGURE 2, FIGURE 3 illustrates in a simplified form the use of a leader unit such as shown in FIGURE 1 for an overhead conveyor, FIGURE 4 illustrates a carrier device suitable for use with a conveyor according to the invention, and FIGURE 5 is a schematic representation of a single track conveyor system which uses carriers such as illustrated in FIGURE 4.

Referring to FIGURE 1, the case of the leader unit 1 is provided with two frequency control knobs 2 and 3, which are arranged to control the frequency of two oscillators within the unit and which are associated with the opening 5 around which a coil 4 is wound. The coil forms part of the L-C tuned circuits of the oscillators so that an oscillation field is set up in the vicinity of the opening 5. Thus the oscillators induce in the coil 4 a field in the vicinity of the opening 5. A vehicle part in the form of a movable projection arm 6 is provided in the side of the leader unit and when the unit is in the vicinity of a tuned circuit whose tuned frequency is substantially identical with the frequency of oscillations in the coil 4 the arm 6 is projected and as will be seen hereafter is used to produce mechanical selection of a conveyor route. In addition to the projection arm 6, a further fixed projection arm 7 is provided at the leading end of the leader unit and at a level which is substantially higher than the level of 6 so that levers struck by 7 will not be struck by 6 and levers struck by 6 will not be struck by 7. The purpose of 7 is to reset any selector means which have previously been actuated along a conveyor route, to their normal positions. The whole leader unit is mounted on a base 8 which is of H section to fit snugly onto the conveyor belt in a given position and to therefore prevent lateral sliding of the leader unit on the belt when either of the arms 6 or 7 engages with a lever at the side of the conveyor. The height of the side sections is not so great however that the leader unit is prevented from being transferred from one belt to another.

FIGURE 1a as mentioned above illustrates a section through the leader unit 1 and illustrates the mode of operation of the projection arm 6. As is clear from the drawing, 6 is mounted horizontally in a pair of bushes 53 and 54 in upright sections of the case 1 and is provided also with a shoulder 55 which compresses a spring 56 in the retracted position of 6. The projection arm is held in its retracted position by means of the catch 57 held up by a light leaf spring 58 but which is released when the solenoid is energised in response to the presence of a tuned circuit at the side of the conveyor, whose tuned frequency is identical with that of the signal provided by the oscillator. The inner-most section of this carries a spring loaded pawl 60 which when the projection arm is released causes the ratchet wheel 61 to be rotated by a position of one tooth. A further pawl 62 is provided to prevent the ratchet wheel 61 being dragged backwards when 6 is returned to its retracted position. As will be seen hereafter 6 is returned to its retracted position by means of a cam plate mounted to the side of the conveyor. The purpose of the ratchet wheel 61 is to be provide switching from one oscillator to another for operation of successive selector means at succeeding junctions along the conveyor route and will be more clearly understood after description of FIGURE 1b.

In FIGURE 1b there is shown a circuit arrangement comprising a pair of tuned grid oscillators and a relay valve. The oscillators comprise valves V1 and V2 respectively and are of well known form and do not require further description with regard to their respective operation but the respective control grids of V1 and V2 are connected via a resistor R1 to the control grid of the valve V3; the tuned frequency of the oscillations is set manually by the knobs 2 and 3 in FIGURE 1 which operate the variable condensers C1 and C2. The anode of V3 is connected via a relay operating coil 63 and an anode load resistor R2 to the source of high tension voltage which comprises a battery mounted within the leader unit. The coil of V3 is connected to the variable contact of a potentiometer P1 which is connected at one terminal to ground and at the other terminal via the resistor R3 to the source of high tension voltage. The purpose of the variable coil connection is to provide a sensitivity control for the relay valve V3. In one of the leads to the primary and secondary windings of the feedback transformers T1 and T2 of the oscillators there are included double throw switches S1 and S2 respectively. S1 and S2 comprise commutator arrangements on the shaft of the ratchet wheel 61 and are arranged to be alternately opened and closed so that when S1 is open S2 is closed and when S2 is open S1 is closed. This commutator is of known form and is not shown.

In operation of the arrangement let it be assumed that the oscillator valve V1 is operating since S1 is closed and the windings of the transformer T1 become associated with a further inductance $L_T$ at the side of the leader unit. The inductance $L_T$ is tuned in combination with a capacitor $C_T$ to a predetermined frequency and if the frequency of oscillations for V1 is the same the presence of the additional tuned circuit $C_T L_T$ has the effect of increasing the potential of the grid of V1 and this increase of potential is applied via R1 to the grid of V3 whereupon V3 conducts more heavily and the position of the movable contact of P1 is so chosen that the relay 63 is operated when this occurs. Operation of the relay 63 energises the solenoid 59 in FIGURE 1a and releases the projection arm 6, at the same time stepping the ratchet wheel 61 round by one tooth position, to open S1 and close S2. Thus the oscillator valve V2 is then rendered operative and the circuit is ready to sense the presence of a further tuned circuit of different frequency from that of $C_T L_T$.

Referring to FIGURE 2, this figure illustrates one example of a conveyor belt system employing units such as described above. The system comprises several conveyor belts 9 to 15, five of which are employed to transport objects to any one of 16 stores, the entrances to which may be in the form of chutes indicated by the references 16 in the drawing. The remaining two conveyor belts are employed to return leader units to the loading point. Three mechanical trigger devices 17 are arranged along the belt 9 in positions prior to the respective conveyor belts 10, 11 and 12. These trigger devices are arranged so that as a leader unit approaches any one of them which has an associated tuned circuit the frequency of which is substantially the same as the frequency being radiated by the leader unit, the projection arm of the leader unit is released. Each trigger device 17 is associated with a guide arm 18 and the projection arm of the leader unit causes the respective guide arm 18 to be operated and move across the conveyor, to transfer items which follow the leader unit onto a branch conveyor belt. In FIGURE 2 the objects are shown being directed from the conveyor belt 19 via the conveyor belt 11 to one of the chutes 16 along 11. Clearly the actuation of successive selector arms along a given route can be in response to the same frequency but in general it is desirable that the leader unit is provided with as many oscillators or sources of oscillation as there are selector arms to be operated. In the present example therefore the leader unit such as described with reference to FIGURES 1, 1a and 1b is suitable since it employs two oscillators which are brought into operation alternately and there are only two selector arms in each required route for a given set of objects. Further, in order that the leader unit itself is not delivered down the final chute 16 on the required route it will be understood that the trigger devices in the case of final delivery chutes are so positioned along the respective belts 10, 11, 12 and 13 that the unit is gone past the respective selector arm before the arm is actuated thereby ensuring that only the objects following the leader unit before the objects are delivered to the required chute 16. The operation of the trigger devices and selector arms will be described in greater detail with reference to FIGURE 2a which shows one method. It will be clear moreover that no frequency responsive selector means is required at the junction of belts 9 and 13 for it is always required that objects shall be transferred from 9 to 13 if they reach that junction. Thus a fixed selector arm 20 is provided.

Referring to FIGURE 2a, this figure illustrates in partially cut away form a junction of two conveyor belts 64 and 65. The rollers upon which the conveyor belts travel are for simplicity excluded from the drawing and the belt 64 has a section removed to show the mechanism which operates the transfer arm 18 which forms a guide for objects engaging with it. The selector arm 18 is mounted on a vertical rotatable support 66 which is supported on bearings held in brackets 67 attached to the side plates 68 of the conveyor. A crank 69 is fixed to the lower extremity of 66 and communicates by means of a connecting rod 70 with a piston 71 which is movable within a cylinder 72. The cylinder 72 is provided with two inlet tubes 73 and compressed air is supplied via one or other of these to the cylinder thereby causing the piston 71 to be moved inwards or outwards. The tubes 73 are connected to a valve chest 74 which is connected to a source of compressed air which for convenience is not shown but may be of any suitable known form, that is either a compressed air cylinder or a small electrical compressor. The valves in 74 are operated by a vertical shaft 75 which carries a pair of projecting levers 76 and 77, the lever 76 forming a transfer control means part actuable as will be seen hereafter by a projected vehicle part. The lever 77 is connected via a rod 78 to a further lever 79 mounted in a similar position on the opposite side of a vertical shaft 80. 79 forms a further transfer control means part actuable by a vehicle part. The shaft 80 is mounted in bearing bushes in a block attached to the side plate 78a of the conveyor. The levers 76 and 79 are therefore so connected together that when 79 is pointing in a direction substantially at right angles to the direction of motion of the belt 64 the lever 76 is pointing approximately along the direction of motion of the belt and vice versa. Moreover the lever 76 is mounted at a level which is substantially lower than the lever 79 and these levels are so chosen as to coincide substantially with the levels of the projection arms 6 and 7 of a leader unit such as shown in FIGURE 1. A cam plate 81 is mounted on brackets 82 and 83 to project over the conveyor belt 64 after the selector arm 18 in the direction of motion of the belt and the level of 81 is chosen to coincide with the level of a projection arm 6 of a leader unit so that the cam plate 81 can operate to return a projected projection arm to its returned position. A similar cam plate is also provided along the conveyor belt 65 but for convenience this is not shown. A tuned circuit 84 is shown mounted on the opposite side of the conveyor belt 64 as the selector arm 18 and includes a coil which is situated at a level which is substantially the same as that for the coil 5 of a leader unit.

In operation of the arrangement shown in FIGURE 2(a) is will be assumed that a leader unit is being carried along the belt 64 towards the selector arm 18 which will be assumed to be in the position shown. Moreover, the leader unit will be assumed to have to be carrying one oscillator which is radiating a frequency which is identical with the frequency of the tuned circuit 84. Thus when the leader unit approaches the lever 79 the projection arm 7 strikes 79 and therefore causes the lever 76 to be moved into a direction at right angles to the belt. At the same time the shaft 75 is rotated and operates the valves in the valve chest 74 and the compressed air causes the piston 71 to be drawn into the cylinder 72 thereby swinging the arm 18 out of the path of the leader unit. At approximately the same time, the coil 4 is located substantially in front of the coil 85 of the tuned circuit 84 and the projection arm 6 of the leader unit is thereby released. The leader unit then proceeds past the selector arm 18 but since the projection arm 6 is in its outward position it strikes the lever 76 thereby returning the arrangement including the vertical shafts 75 and 80 to the position shown in the figure and at the same time causing the selector arm to be moved to the position shown in the figure so that the objects following the leader unit are directed on to the belt 65. As the leader unit passes the cam plate 81 the plate 81 appears at the end of the projection arm 6 and returns it to its original position. Clearly if the projection arm 6 is not actuated by virtue of the frequency of the tuned circuit 84 being identical with that of the oscillator in the leader unit, the selector arm 18 remains in a position opposite to that shown in the drawing and both the leader unit and following objects pass along the belt 64 without transfer to 65.

The arrangement of the selector arm 18 and the trigger device comprising the vertical shaft 75, 80 and associated levers is suitable for operation at points along belts such as 10, 11, 12 and 13 in FIGURE 2, that is the final belt of a route before the objects are delivered to their destination, since the leader unit is allowed to pass along the belt without rerouting with its associated objects. Arrangements suitable for use along belts in a similar situation to the belt 9 in FIGURE 2 differ from the arrangement shown in FIGURE 2a only in that the trigger device is situated at a suitable distance in front of the selector arm 18 so that the arm 18 is operated before the leader unit has passed it thereby ensuring that the leader unit is rerouted together with its associated objects on to the belt 65 in response to an identity of frequencies between the tuned circuit 84 and the oscillator in the leader unit. Such an arrangement is not shown in the present drawing for it only constitutes a slight modification of FIGURE 2a and in principle only requires a lengthening of the pipes 73 connecting the cylinder 72 to the valve chest 74.

Although the conveyor belt system described with reference to FIGURES 1 and 2 only requires the use of two oscillators in the leader unit, further oscillators may be included to accommodate for use in a conveyor belt system which requires the operation of more than two selector arms along a given route, the oscillators being brought into operation successively and one at a time by actuation of the ratchet wheel 61 each time the projection arm 6 is operated.

In FIGURE 3 the "leader" unit of FIGURE 1 is shown as it may be employed in an overhead conveyor system. In the example, the conveyor system comprises pairs of parallel rails 30 and 31 in which trolleys are drawn along by chains in well-known manner. These trolleys are provided with supporting limbs 32 which can support either a "leader" unit L or a carrier for conveying items along a desired route. At a junction of two paths a track switch 33 which is normally in the other position from that shown so as to direct trolleys to the left hand path may be switched to the position shown by operation of the relay in the "leader" unit and the consequent activation of trigger device 34 in a similar manner to that described for FIGURE 2a. Operation of the relay in the "leader" unit and hence the switch 33 also causes the trigger 35 to be set so that the reset arm 7 of any following "leader" unit causes the switch to return to its normal position and thereafter activates or passes the device 34 so as to operate or pass the switch 33. It will be seen furthermore that the reset arm is positioned to project from the same face of the leader unit as the oscillator control knobs. Resetting means for the movable projecting member in the leader unit is provided in a similar manner to that given in FIGURE 2(a).

As an alternative to employing a relay operated switching means at each junction a mechanical trigger device similar to the device 17 of FIGURE 2 may be employed and the solenoid 34 on the track may be employed to perform a particular function such as triggering a device similar to the trigger 35 to unhook carriers from their respective support bars in response to a predetermined frequency radiation from the leader unit on the carriers, for example.

In a further arrangement in accordance with the present invention carriers such as illustrated by FIGURE 4 may be employed. These carriers consist of bins 40 which are pivoted at points 41 and 42 in a cradle 43 and are maintained in an upright position by means of a locking pin 44 and an L-shaped arm 45 on the bin 40 as shown, the pin 44 being pivoted on the cradle 43 at the point 46 and the arm 45 being rigidly fixed to the bin 40. The carriers may be conveyed by an inverted conveyor system or by an overhead conveyor system along a desired route as selected by a "leader" unit in the manner described above with respect to FIGURES 1 and 2 or 3, for example, until the required destination is reached. At this required destination a delivery trigger 47 in the form of a wedge on the end of a pivoted arm is operated by the activation of a mechanical trigger device (not shown) to the open position so as to lift the end of pin 44 and rotate it about the pivot 41. The bin 40 is thus tipped by the trigger 47 to deposit any items contained therein at the required destination which may be the entrance of a chute leading to a storage or loading bay, for example. The trigger 47 is illustrated in the open position and may be readily reset by mechanical action by the reset arm of another "leader" unit to the side of the conveyor track by rotation about the pivot 48.

The conveyor system for the carrier is not illustrated for the sake of clarity but the direction of conveyance is indicated by an arrow.

FIGURE 5 shows in schematic form a single track conveyor system for conveying items in carriers 50 of the type illustrated by FIGURE 4 to any one of sixteen stores 51. Each of the stores 50 is associated with a mechanical trigger device 52 similar to the devices 17 of FIGURE 2 which may be triggered as described above by the moveable projection member arm of a "leader" unit L to open the associated delivery triggers 47 one of which, indicated by the reference 47', is shown in the open position. In such an arrangement no track switching means are required and the invention is applied merely to select particular destinations along the track for conveyed items.

Although the invention has been described herein with reference to conveyor systems in which the leader unit leads articles along a required route, the leader unit may be arranged to travel along a required route and select articles from reservoirs or the like situated along the route. That is, the reverse process is in effect performed and the selected articles are then delivered to a predetermined destination.

What I claim is:

1. Apparatus for automatically controlling the transfer of articles comprising a plurality of transfer control means disposed at spaced positions whereby the article transfer can be controlled, a vehicle, actuating mechanism for said transfer control means including a part of said vehicle and a plurality of parts one for each transfer control means coupled to the respective transfer control means, said vehicle part being switchable from inactive to an active condition whereby a transfer control means can be switched in a predetermined way in response to movement of said vehicle to cause said vehicle part to engage with the respective transfer control means part, and selector means on the vehicle which can be preset to cause said vehicle part to be switched to its active condition in response to a selection from a plurality of different responses, response means located in proximity to said transfer control means to provide said plurality of responses, the response means in proximity to different transfer control means being arranged to provide different responses, thereby to cause said vehicle part to be switched to its active condition and switch one or more of said transfer control means and not others of said transfer control means.

2. Apparatus for automatically controlling the transfer of articles comprising a plurality of transfer control means disposed at spaced positions whereby the article transfer can be controlled, a vehicle, actuating mechanism for said transfer control means including a part of said vehicle and a plurality of parts one for each transfer control means coupled to the respective transfer control means, said vehicle part being switchable from inactive to an active condition whereby a transfer control means can be switched in a predetermined way in response to movement of said vehicle to cause said vehicle part to engage with the respective transfer control means part, and selector means on the vehicle can be preset to cause said vehicle part to be switched to its active condition in response to a selection from a plurality of different responses, electromagnetic response means located in proximity to said transfer control means to provide said plurality of responses, the response means in proximity to different transfer control means being arranged to provide different responses, thereby to cause said vehicle part to be switched to its active condition and switch one or more of said transfer control means and not others of said transfer control means.

3. Apparatus according to claim 2 wherein said selector means comprises a plurality of oscillatory circuits which can be preset to oscillate at a selection from among different frequencies respectively, characteristic of different transfer control means and means responsive to predetermined loading of any oscillatory circuit for switching said vehicle part to its active condition, said response means located in proximity to each of said transfer control means parts comprising a tuned circuit, respective tuned circuits being tuned to frequencies characteristic of the respective transfer control means and adapted so to load an oscillatory circuit.

4. Apparatus according to claim 3, wherein said vehicle comprises means for switching said transfer control means unconditionally in a predetermined manner before said vehicle part is able to engage with the respective transfer control means parts, engagement between said vehicle and a transfer control means part being such as to switch the respective transfer control means in a different manner.

5. A vehicle comprising a vehicle part being switchable from one position to another position, an oscillatory circuit for emitting a predetermined electrical radiation detecting means for detecting loading of said oscillatory circuit due to the proximity of a tuned circuit having a tuned frequency substantially equal to that of said oscillatory circuit and means responsive to said detecting means for switching said vehicle part.

6. A vehicle according to claim 5, said vehicle part comprising an abutment member which is switchable to a protruding position from said vehicle in response to loading of said oscillator.

7. A conveyor system comprising a plurality of transfer control means located at spaced positions along a vehicle route, a vehicle means for propelling said vehicle along said route, each transfer control means comprising an actuable part and said vehicle comprising an actuating part which is switchable from a non-actuating state to an actuating state and which when in said actuating state is engageable with an actuable gate part on movement of the vehicle to cause transfer of the vehicle from one path to another path, there being disposed on said vehicle a selector, said selector comprising a plurality of oscillatory circuits which are presettable to oscillate at a selection from among different frequencies respectively characteristic of different transfer control means and means responsive to predetermined loading of said oscillatory circuits to cause said vehicle part to be switched from one of said states to the other, and each transfer control means having in proximity therewith a tuned circuit tuned to a frequency characteristic thereof to produce loading of an oscillatory circuit when said vehicle is in proximity to a tuned circuit having a frequency to which said selector is preset.

8. A conveyor system according to claim 7, said vehicle being provided with a further part engageable with a transfer control means part at each transfer control means to set the respective transfer control means to a predetermined state prior to said first vehicle part becoming effective to switch the transfer control means to another state.

References Cited in the file of this patent

UNITED STATES PATENTS

| 1,797,651 | Gergacsevics | Mar. 24, 1931 |
| 1,804,153 | Cowley | May 5, 1931 |
| 1,817,692 | Kloss | Aug. 4, 1931 |
| 2,688,933 | Spafford | Sept. 14, 1954 |
| 2,798,586 | Freeman | July 9, 1957 |
| 2,828,480 | Golladay | Mar. 25, 1958 |